July 14, 1964

C. BLOCK ETAL 3,140,645

PHOTOPRINTER TIMING APPARATUS

Filed Aug. 5, 1957

INVENTORS
CHARLES BLOCK
JOHN R. GARDNER

BY

*Bauer and Seymour*
ATTORNEYS

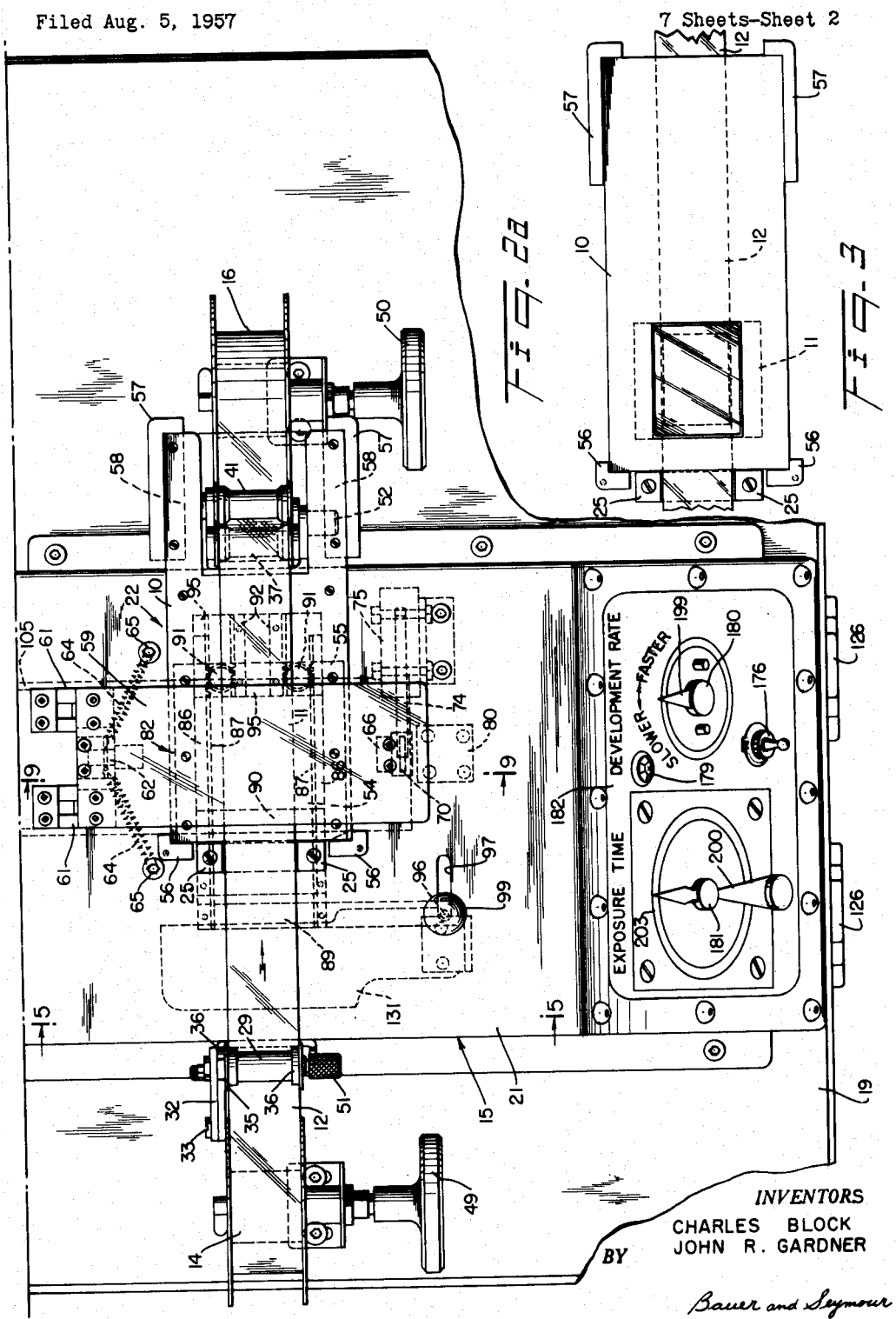

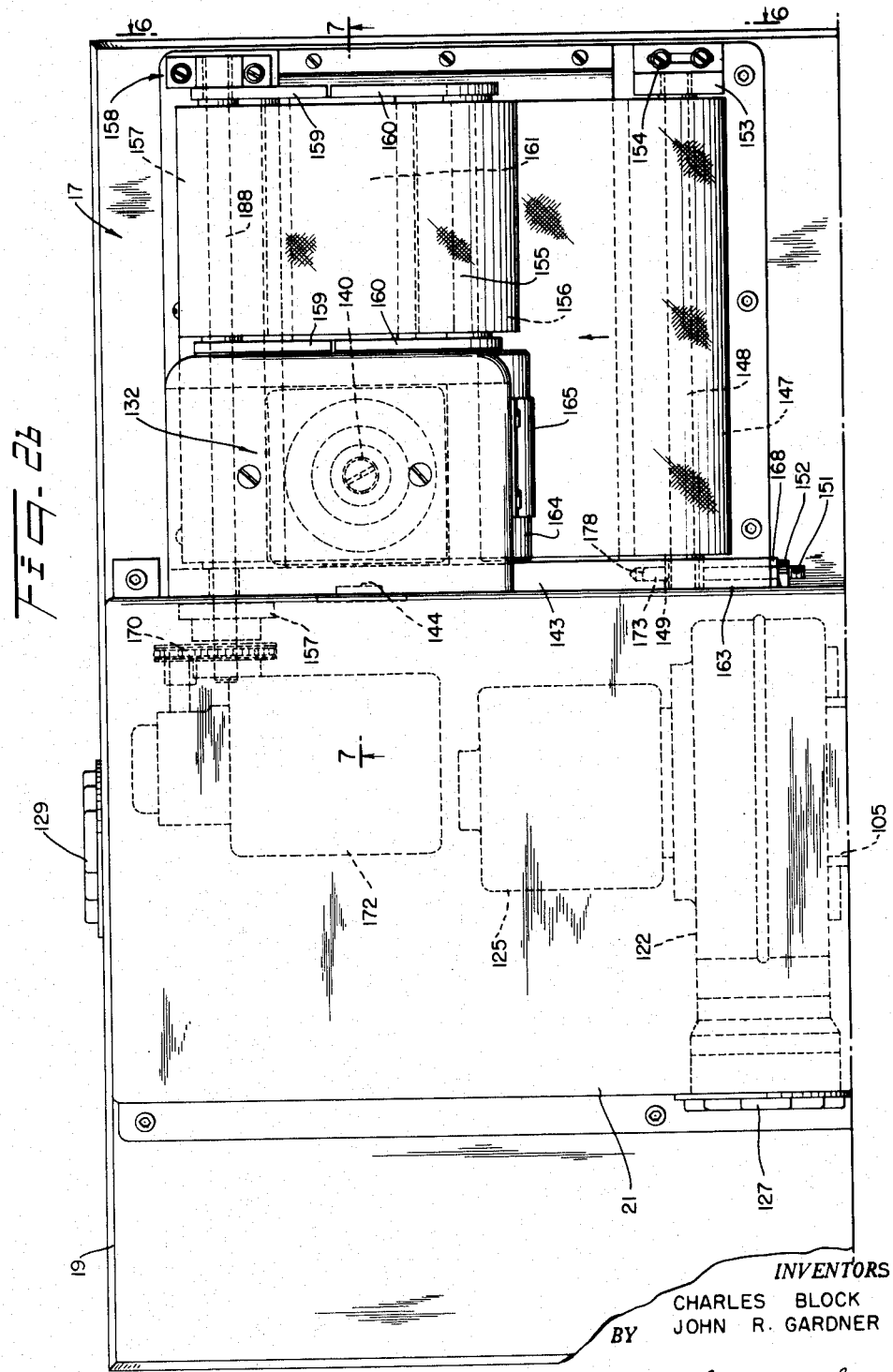

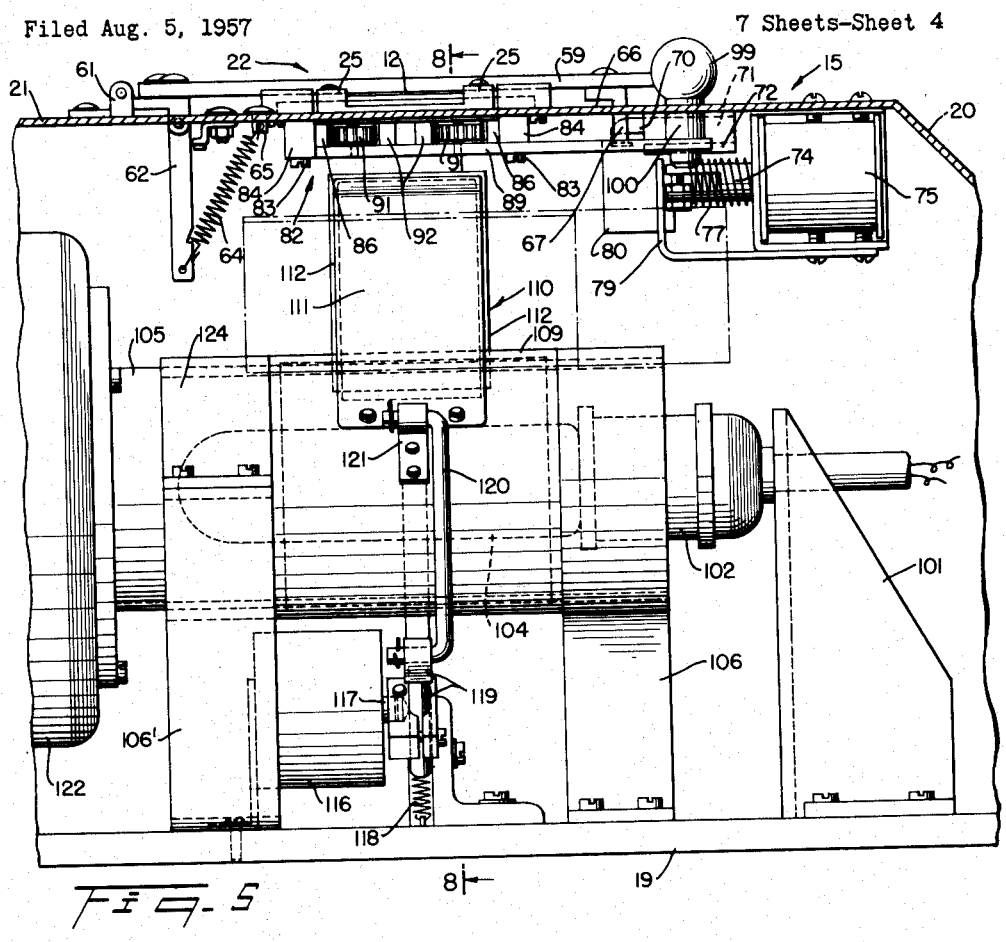

July 14, 1964  C. BLOCK ETAL  3,140,645
PHOTOPRINTER TIMING APPARATUS

Filed Aug. 5, 1957  7 Sheets-Sheet 5

INVENTORS
CHARLES BLOCK
JOHN R. GARDNER
BY
Bauer and Seymour
ATTORNEYS

July 14, 1964 C. BLOCK ET AL 3,140,645
PHOTOPRINTER TIMING APPARATUS
Filed Aug. 5, 1957 7 Sheets-Sheet 6

INVENTORS
CHARLES BLOCK
JOHN R. GARDNER
BY Bauer and Seymour
ATTORNEYS

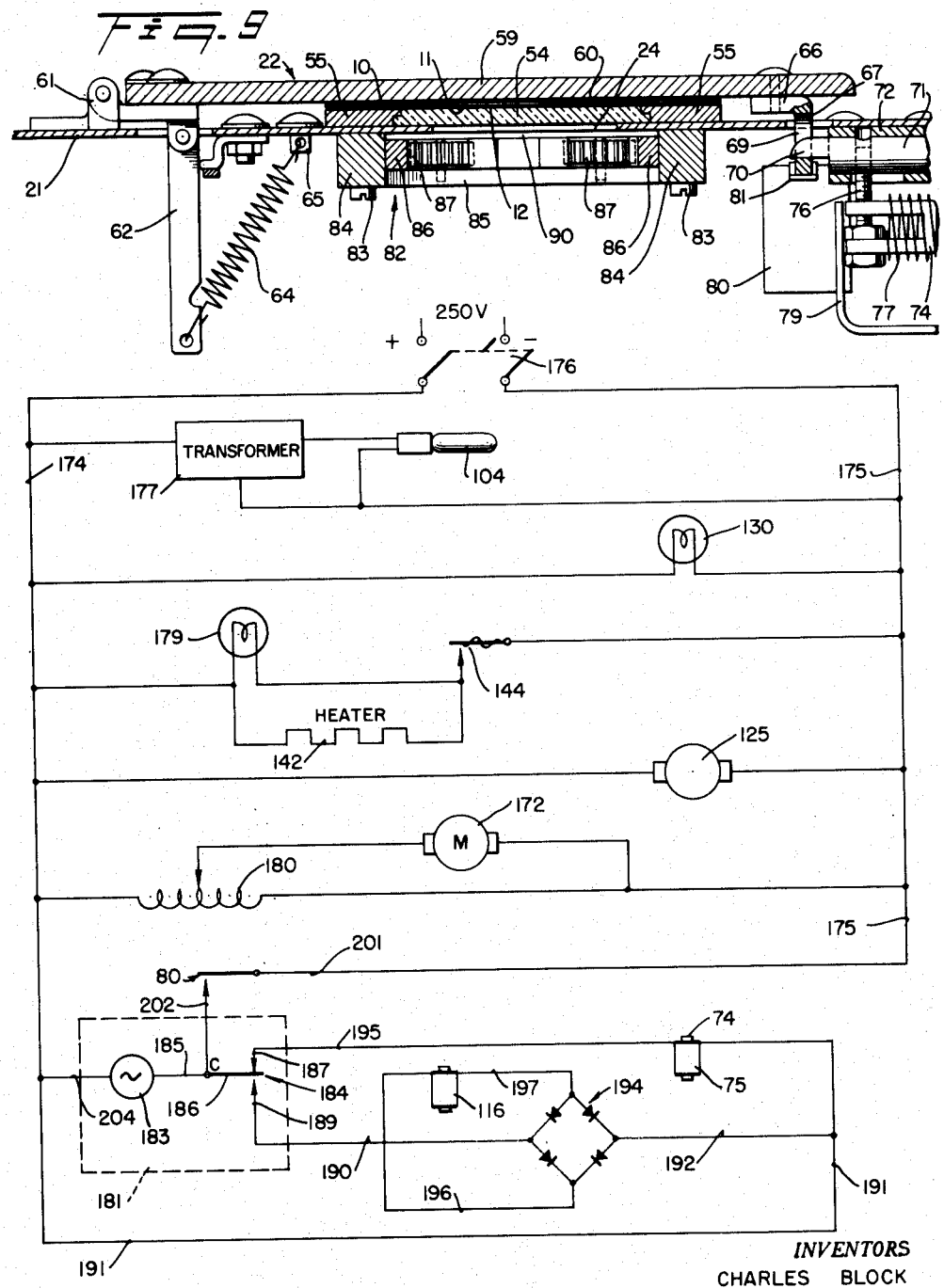

United States Patent Office 3,140,645
Patented July 14, 1964

3,140,645
PHOTOPRINTER TIMING APPARATUS
Charles Block, North Bellmore, and John R. Gardner, Staten Island, N.Y., assignors, by mesne assignments, to Minnesota Mining & Manufacturing Company, St. Paul, Minn., a corporation of Delaware
Filed Aug. 5, 1957, Ser. No. 676,261
8 Claims. (Cl. 95—73)

This invention relates to apparatus for photographically reproducing film sections, such as microfilm upon sections of film mounted in apertured cards.

The invention has among its objects the provision of an improved simplified apparatus for photographically reproducing film sections.

A further object of the invention lies in the provision of novel apparatus for reproducing film sections in strip form upon duplicate film sections.

Yet another object of the invention lies in the provision of novel apparatus for reproducing film sections upon duplicate sections of film mounted in apertured cards.

Still another object lies in the provision of apparatus for photographically reproducing film sections having a light-controlling shutter which is operated by the positioning of a film section holder.

Another object is the provision of photoprinting apparatus including means which automatically opens the film section holder after a predetermined exposure of the film section to the printing light.

A further object of the invention lies in the provision of a photoprinting apparatus having a novel film-positioning or setting light source; in a preferred embodiment the film-positioning light source is such as automatically to become operative when the light-controlling shutter of the apparatus is closed.

Still another object resides in photoprinting apparatus of the character described incorporating a novel adjustable mask for the film section to be reproduced.

Yet another object lies in the provision of novel photoprinting apparatus including an improved combination of filmprinting or exposing means and film developing means.

The above and further objects and novel features of the present invention will more fully appear from the following detailed description when the same is read in connection with the accompanying drawings. It is to be expressly understood, however, that the drawings are for the purpose of illustration only and are not intended as a definition of the limits of the invention.

In the drawings, wherein like reference characters refer to like parts throughout the several views, FIG. 1 is a view in elevation of the combined photoprinting and developing apparatus of the invention, the view being taken from the front or operator's side of the apparatus;

FIG. 2a is a fragmentary view in plan of the portion of the apparatus at the front or operator's side thereof;

FIG. 2b is a view in plan of the rear portion of the apparatus, FIGS. 2a and 2b together constituting a view in plan of substantially the entire apparatus;

FIG. 3 is a fragmentary somewhat simplified schematic view in plan of the film-holding portion of the apparatus, the platen being omitted in such view to show the relationship between the film strip and the duplicate card superimposed thereon;

FIG. 4 is a view in end elevation of the apparatus, the view being taken in the direction from left to right in FIG. 1;

FIG. 5 is a vertical section through the apparatus in the vicinity of the film holding and exposing mechanism, the section being taken along the line 5—5 of FIG. 2a;

FIG. 9 is a fragmentary view in vertical section through the film holder of the apparatus, the section being taken along the line 9—9 of FIG. 2a; and FIG. 10 is a wiring diagram showing the manner of connection of the various operating and controlling elements of the apparatus.

Figure 1:
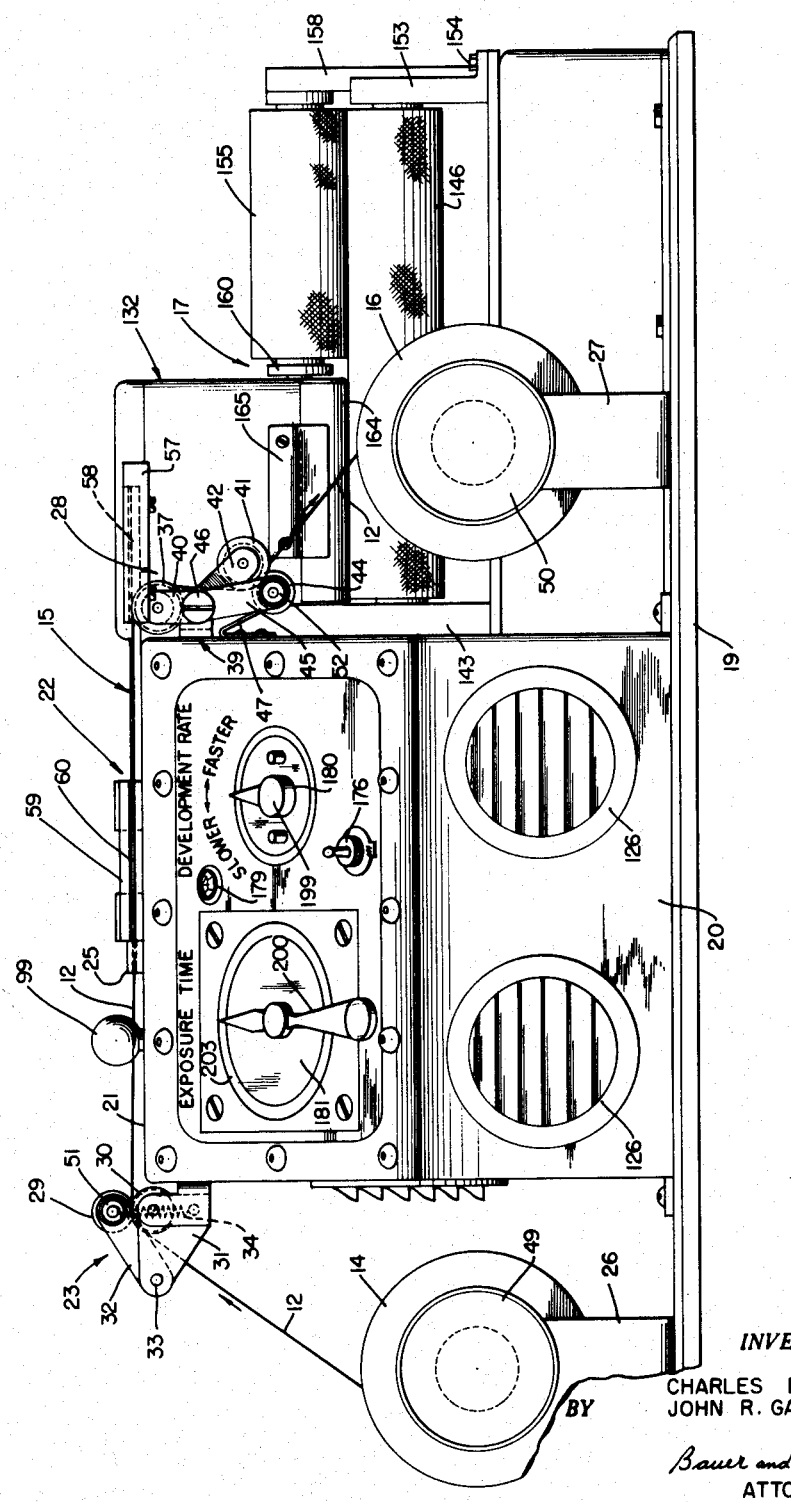

Referring now to the drawings, there is shown by way of example one form of apparatus constructed in accordance with the present invention. Such apparatus, as will be more readily understood after consideration of the drawings, particularly FIGS. 1, 2a and 2b thereof, includes mechanism for feeding a series of original or master film sections in strip form past a printing station. Means is provided at such station for correctly positioning a duplicate film section, here shown as a film insert in an aperture card, in alignment with the film strip. In the illustrative apparatus, which is a contact printer, the duplicate film section is superimposed on the original film section and the original and duplicate film sections are held firmly together and in accurate registry by the platen member. The photoprinting unit shown includes a shutter interposed between the printing light source and the film sections, the shutter being automatically opened when the film holding platen is placed in closed position. Preferably the apparatus includes a timer which is automatically started upon the closing of the platen, and means operated by the timer automatically to open the platen upon the expiration of a desired printing time. The apparatus also includes a setting light, to facilitate positioning of the film, which automatically becomes operative when the film-exposing shutter is closed.

The developing unit, which in the embodiment shown is of the heater type for developing by heat-treating thermally developable film, is so positioned that the exposed film sections may be readily fed thereinto after they are removed from the printing unit.

For purposes of illustration only, the duplicate film sections are here shown as inserts in duplicate cards, of which one designated 10 is shown in FIGS. 3, 7, 8, and 8a. The original or master film sections are shown connected in the form of a film strip 12. The apparatus shown allows the reproduction of any desired section of film strip 12 upon the duplicate film section 11 in a card 10 by traversing the film strip to position the desired section thereof at the printing station, superimposing a duplicate film section 11 in a card 10 thereon, adjusting the longitudinal positioning of the film strip for accurate registry of the film sections, pressing the film sections together, and exposing them to light. The card 10 shown is an apertured card of the record type commonly employed in connection with known and existing record card tabulating and sorting systems and machines. It will be understood, however, that the present invention is not limited to the printing and developing of film sections mounted in cards of the statistical or tabulating machine type, since other forms of record or catalogue cards, as well as ordinary cards, may be used for this purpose. Additionally, apparatus in accordance with the present invention may be used to advantage in the printing and developing of various other types of film sections, including film sections which are not mounted in cards or similar supporting structures. It will also be understood that, in accordance with certain features of the invention, the master film sections need not be connected in strip form but may be employed either in separate unmounted form or mounted in apertures in supporting structures such as cards.

Turning now to a detailed description of the apparatus, it will be seen that the apparatus is in the form of a unit including a printer 15 and a developer 17 mounted upon a horizontal plate member 19. The printer has a housing 20, the upper portion 21 of which is flat and has a printing station generally designated 22 thereon. The top 21 of housing 20 has an opening 24, therethrough (FIGS. 8, 8a, and 9) such opening generally corresponding in shape to, but being somewhat larger than, the film section to be reproduced. A film strip guide in the form of a shallow U-shaped member having upstanding end portions 25 is positioned at the entry end of opening 24, members 25 defining a guideway, accurately receiving film strip 12. A supply reel 14 for the film strip 12 is positioned beyond the entrance end of the printing unit 15, and a take-up reel 16 for the film strip is positioned beyond the exit end of the printing unit. Reels 14 and 16 are accurately aligned with the film-receiving guideway defined by members 25. Reels 14 and 16 are supported on member 19 by brackets 26 and 27, respectively.

Affixed to housing 20 of the printing unit is an entrance film guiding and traversing means generally designated 23, which insures the accurate alignment of the film strip in its travel from reel 14 into the guideway defined by members 25. Means 23 includes a pair of pinch rolls 29 and 30 which feedingly engage the side, unprinted portions of the film strip. The lower roll 30 is rotatably mounted between spaced parallel upstanding side arms on a bracket 31 affixed to the vertical side wall of housing 20 at the entrance end thereof. The upper roll 29 is rotatably mounted on the upper end of an arm 32 which is pivotally mounted on one side of bracket 31 by a pin 33. Roll 29 is constantly resiliently urged downwardly into cooperation with roll 30 by a coil tension spring 34 extending between the upper end of arm 32 and a lower fixed portion of bracket 31. In the embodiment shown, roll 30 is made of metal such as brass, and has end flanges between which the film strip is received, a central portion of a smaller diameter, and annular portions of a larger diameter inwardly of the flanges. Roll 29, which is preferably made of a material such as nylon, is provided with end flanges 35, the flanges being spaced so as to be received between the flanges on roll 30 and to press the edges of the film strip between them and the larger diametered annular portions at the ends of roll 30. The film strip may thus be accurately traversed by means 23. The central printed zone of the film is, however, free from any pressure by rolls 29 and 30 which might tend to scratch it.

The film strip 12 extends from guiding and feeding means 23 across the top of housing 20, through the printing station 22, to an exit film strip traversing and guiding device 28. Device 28 includes a bracket 39 affixed to the exit end of housing 20, the bracket having spaced parallel vertically extending arms 30 which journal an upper guide roll 37 therebetween. Bracket 39 has an arm 42 which extends downwardly and away from the printing unit. A second guide roll 41 is rotatably mounted on the lower end of arm 42. In its travel from the printing station, the film strip 12 passes over roll 37 and beneath roll 41 prior to its being taken up by reel 16. In order to maintain the film strip under suitable tension there is provided a third roll 44 which is yieldably urged into cooperation with roll 41. Roll 44 is journaled on the lower end of an arm 45, the upper end of such arm being pivotally mounted on bracket 39 by pivot pin 46. Arm 45 is constantly urged in a counterclockwise direction (FIG. 1) by a bent leaf spring 47 having one leg secured to the vertical wall of the housing 20 and the other leg engaged with the lower end of arm 45. Rolls 37 and 41, which may be made of metal such as brass, are similar to the above described roll 30. Roll 44, which may be made of a material such as nylon, has the same structure as roll 29. The film strip is engaged at its edges between rolls 41 and 44 in the same manner as between rolls 30 and 29, respectively, whereby the film strip is accurately guided and traversed by device 28 while being held to as to prevent the scratching of the central printed portion of the film strip.

In order to allow the film strip to be fed forwardly or rearwardly, as required to bring a desired film strip section into printing position at the printing station 22, the film reels 14, 16 and film traversing and guiding devices 23, 28 are provided with thumb knobs by means of which they may be readily rotated. Reels 14 and 16 are provided with knobs 49 and 50, respectively. A thumb knob 51 is secured to the end of roll 29 of device 23 facing the operator; a similar knob 52 is secured to the same end of roll 44 of device 28. The rolls 30 and 37 of devices 23 and 28, respectively, are so positioned that the film strip 12 in its run between traversing and guiding devices 23 and 28 tends normally closely to overlie the upper surface of window 54 when platen 59 is retracted even though the film strip is not pressed downwardly by a duplicate card 10 superimposed thereon at the printing station.

Figure 8:
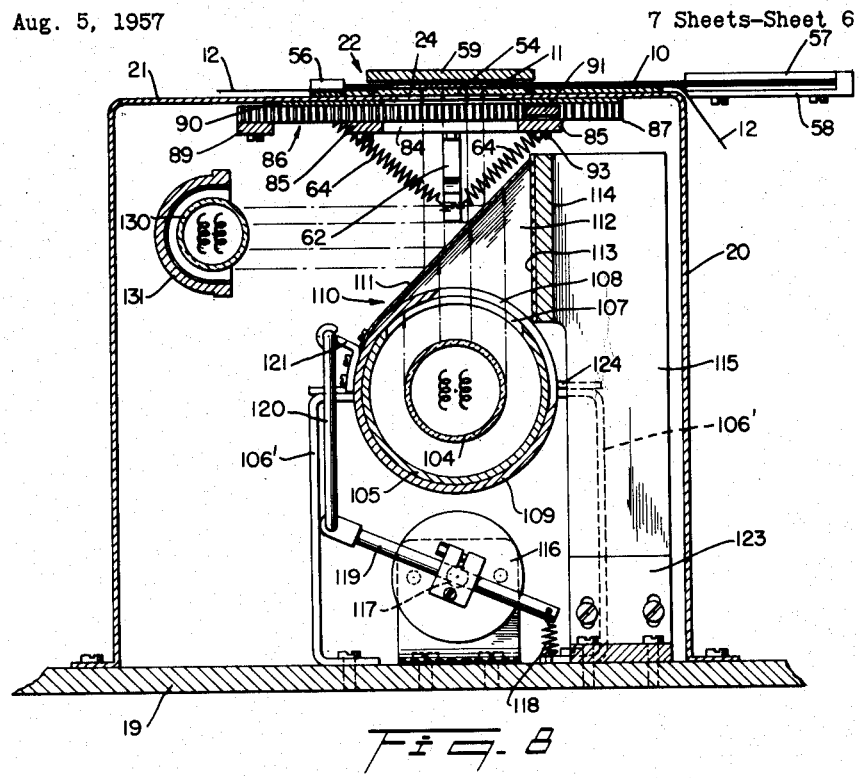
FIG. 8 is a vertical section through the film-holding and exposing mechanism of the apparatus, the section being taken along the line 8—8 of FIG. 5, the shutter interposed between the exposing or printing light and the film section being shown in closed position.

The construction of printing station 22 is illustrated most clearly in FIGS. 2a, 8 and 9. As shown, the opening 24 through housing top 21 at the printing station is provided with a transparent window 54 made of material such as glass. The edges of the window overlie the edges of the opening 24 in housing 20 and are secured in place by a window-embracing bezel frame member 55 secured to the top 21 of the housing 20. Means are provided at such station for positioning a duplicate card 10 above the film strip 12 so that the duplicate film section 11 in the card is accurately centrally in register with the opening 24. The card positioning means takes the form of two laterally spaced confronting guides 56 engaging the corners of card 10 at the left (FIGS. 2a and 3) and two laterally spaced confronting members 57 having portions engaging a substantial length of each of the right hand side edges of the card and also the adjacent corners of the card. Guide members 57 overlie and are secured to extensions 58 integral with the window-retaining member 55, such extensions being laterally spaced to allow the passage of film strip 12 downwardly between them in its travel to device 28.

A platen 59, having a resilient pad 60 on the bottom thereof, is connected at its rear to the upper portion 21 of housing 20 by hinge means 61. Means is provided constantly to urge the platen toward its upright or open position in such manner that the platen automatically opens when the latching means, to be described, which selectively holds the platen in closed position is released. The platen-opening means is made up of an arm 62 which depends centrally from the platen adjacent hinges 61, and a pair of coil tension springs 64. One end of each of the springs is secured to the lower end of arm 62, the upper end of each of the springs being secured to a stud 65 beneath housing member 21 at the respective sides of the platen.

The forward edge of platen 59 is provided with a centrally located depending latch member 66 which has a depending latching portion 67 provided with a vertical slot 69 therein. When the platen is in closed position, as shown in FIG. 9, part 67 of the latching member cooperates with a horizontally reciprocable latching dog or finger 70 which projects into slot 69 so as to hold the platen in closed position. Dog 70, which has an upper cam surface, is made as an extension on a plunger 71 which is reciprocably mounted in a guide 72 secured beneath top portion 21 of housing 20.

The plunger 71 is constantly resiliently urged to the left (FIGS. 5 and 9) so that, during normal use of the device, as the platen is lowered toward closed position the lower end of latch member 67 engages the upper cam surface on dog 70 to thrust the dog to the right until the dog finally snaps into slot 69. The dog is automatically retracted, by means to be described, upon the termination of the printing cycle whereby to allow the platen to open. Such actuation of dog 70 is effected by the following mechanism: A solenoid 75 is fixedly secured at the top of housing 20, the plunger 74 of the solenoid lying horizontally and in vertical alignment with plunger 71. An upstanding stud 76 extending through the free end of solenoid plunger 74 projects through a longitudinally extending slot in the bottom of guide 72. The upper end of stud 76 is threaded into a vertical opening in plunger 71 extending transversely thereof. It will thus be seen that plungers 74 and 71, together with dog 70, reciprocate as a unit. A coil compression spring 77, acting between the left hand end of the solenoid housing (FIG. 5) and the stud 76 constantly urges the plungers and the dog 70 to the left toward the position in which plunger 74 contacts the vertically extending arm 79 of an L-shaped stop member secured to the solenoid housing. The plungers and dog 70 are retracted to allow the platen to open upon the energization of solenoid 75. When the solenoid is energized, it retracts its plunger 74 to overcome spring 77, whereby to withdraw dog 70 from slot 69 in the latch member of the platen.

The energization of solenoid 75 is under the control of a timer, to be described in connection with FIG. 10, the timer in turn being under the control of means responsive to the positioning of the platen 59. Thus, in the illustrative embodiment the printing cycle is automatically initiated when the platen is placed in fully closed position, and the printing cycle is terminated and the platen is opened at the end of a predetermined printing time. The illustrative apparatus thus includes a means responsive to the position of the platen as an element of its control mechanism. Such means here takes the form of a microswitch 80 which is fixedly positioned within the housing 20 with the end of its plunger-operating arm 81 located in the path of the lower end of portion 67 of the platen-latching member. The microswitch is so located relative to the latching member and dog 70 that the switch is not closed until the platen is in the fully closed position shown in FIG. 9. The switch 80 is of such character that it immediately opens when, after retraction of the dog 70, the platen has begun to open. Further description of the manner of interaction of the switch 80 with the other elements of the control mechanism for the apparatus will be given in connection with FIG. 10.

The printing station of the illustrative device is provided with an adjustable mask whereby a film section of selected width longitudinally of the film strip may be printed. The adjustable mask is best illustrated in FIGS. 2a, 5 and 9. Positioned beneath bezel member 55 and surrounding the opening 24 in the panel 21 of housing 20 is mask frame member 82. Member 82 is secured to panel 21 of the housing by studs 83 having their upper ends passing through panel 21 and threaded into bezel member 55. Such studs may also serve to fasten member 55 to the panel.

Member 82 has two side portions 84 which abut the underside of panel 21 of the housing 20 and which extend longitudinally of the film strip beneath opening 24 at either side thereof, and two end portions 85 which extend transversely of the film strip and are spaced from the lower surface of panel 21 so as to provide for the reception of the mask-forming members. Reciprocably mounted inwardly of side portions 84 of member 82, and positioned at the opposite side edges of the space between end portions 85 and panel 21 are two parallel outer rack members 86, the outer side surfaces of the rack members being guided by the longitudinal side members 84 of the mask frame member 82. Each of the members 86 carries a rack gear 87 on its inner face. The two rack members 86 are connected for joint movement longitudinally of the film strip by a cross arm 89 which connects the left hand (FIG. 2a) ends of the rack members.

Figure 8A:
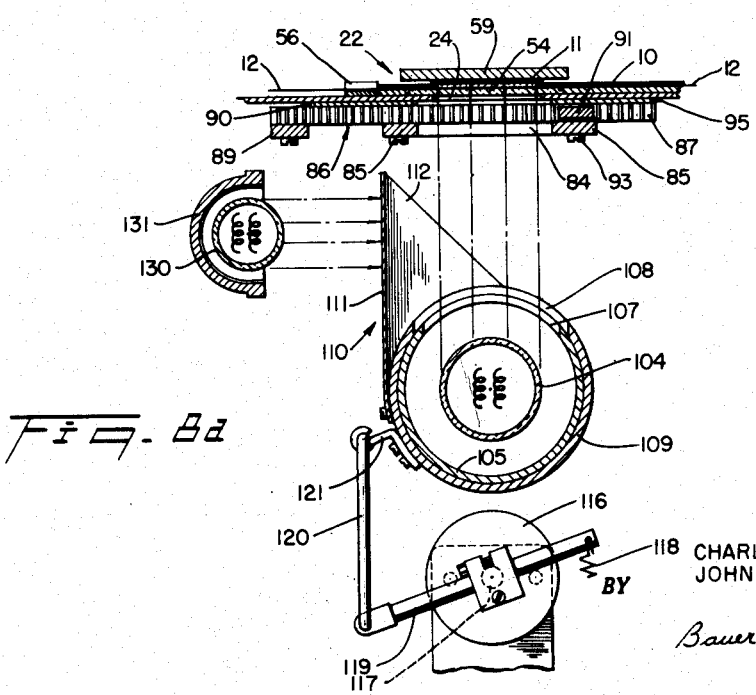
FIG. 8a is a simplified schematic view in vertical section similar to FIG. 8 but with the shutter in open position.

A first mask plate 90 is mounted on top of and is connected to members 86 in the vicinity of the printing station, as shown in FIGS. 2a, and 8 and 8a. Members 86 are longitudinally adjustable from a position in which the inner or right hand (FIG. 2a) edge of mask 90 lies on the transverse center line of opening 24 at the printing station, to one in which such inner edge of the mask member lies outwardly of the left hand edge of opening 24. The mask of the invention includes novel means whereby a second mask member 95, similar to member 90, is moved the same distance toward and away from the transverse center line of opening 24 as member 90.

The means supporting and moving the second mask member 95 includes a pair of relatively short rack members 92 which are positioned laterally inwardly of the free ends of the outer, longer rack members 86 and are connected by the second mask member 95 positioned above them. The mask member 95 and rack members 92 are reciprocable as a unit in the guideway provided by the underside of panel 21 of the housing and the respective end member 85 of mask frame 82. Rack members 86 and 92 are drivingly connected for movement in opposite directions by pinion 91 which are journalled on axle pins affixed to the right hand (FIG. 2a) member 85 of the frame member 82 beyond the right edge of opening 24, pinions 91 being in mesh with the respective confronting rack members 86 and 92. It will be seen that when rack members 86 are moved to the right (FIG. 2a) the inner edges of mask members 90 and 95 approach the transverse center line of the opening at the printing station, and that when rack members 86 are moved to the left the two mask members move apart equal distances from said center line.

The mask is adjusted and held in adjusted position by means best shown in FIGS. 2a and 5. A stud 96 is affixed to the free end of arm 89. The stud projects upwardly through a longitudinally extending slot 97 in panel 21 of the housing 20, and is held in adjusted position by a nut in the form of a knob 99 threadedly engaged with the top of stud 96. The knob functions selectively to clamp the portion of panel 21 bordering the slot between such knob and a nut-like member 100 securing stud 96 to arm 89 and lying beneath panel 21.

The printing light source and the shutter cooperating therewith are shown most clearly in FIGS. 4, 5, 8, and 8a. A horizontally disposed light bulb 104 is located vertically beneath the printing station with its axis disposed transversely of the film strip. The bulb is mounted in a socket 102 which is supported on a bracket 101 affixed to the base 19 of the unit. A circular cylindrical lamp housing sleeve 105 is positioned about the light bulb coaxial thereof. Housing 105 is supported at the front of the unit in a bracket 106 which is secured to base 19 of the unit. A somewhat similar bracket 106′ supports the rear of the lamp housing. The front bracket 106 may be made from an integral piece of stock, the upper end of such stock being bent into the form of substantially a complete circle and embracing the forward end of housing 105. For convenience of assembly, the rear bracket 106′ is made with a detachable upper cap member 124 which is bolted to the lower part of such bracket.

The central upper portion of housing 105 underlying opening 24 at the printing station is removed to form an opening 107, as shown in FIGS. 8 and 8a. Rotatably supported on the lamp housing 105 between brackets 106 and 106′ is an outer, circular cylindrical sleeve member 109 which forms a portion of a selectively operable shutter generally designated 110. Member 109 has an opening 108 therein which, in the embodiment shown, is slightly wider than and at least as long as opening 107 in housing 105, so that, when the shutter is in the open position of FIG. 8a, member 109 allows the unrestricted passage of a beam of light having an area at least as great as that of opening 24 from lamp bulb 104 through opening 24 at the printing station.

Shutter 110 includes a sheet metal member including a flat plate portion 111, disposed tangentially of member 109, and two end plate members 112 extending transversely of the axis of member 109 and lying beyond the respective ends of opening 108. Shutter portions 111 and 112 may be parts of an integral plate made, for example, of light sheet metal such as aluminum. The element made up of members 111 and 112 is attached to member 109 so that when the latter is in open position (FIG. 8a) member 111 lies in a vertical plane. The shutter is completed by a fixed vertical plate member 114 supported on a generally upright bracket member 115 which in turn is mounted for restricted vertical and angular adjustment on a slotted lower bracket means 123 secured to plate 19. The inner, shutter-confronting face of plate 114 is provided with a layer of resilient material 113 which is impervious to light; member 113 may conveniently be neoprene, which is also virtually unaffected by the heat of bulb 104. The shutter and the parts cooperating therewith are so arranged and adjusted that when member 109 is swung clockwise (FIG. 8), plate 114 and resilient layer 113 thereon function to stop the shutter with the upper edge of plate 111 and the side edges of plates 112 in light-sealing relationship.

The shutter 110 is selectively moved into either the closed position of FIG. 8 or the open position of FIG. 8a by a solenoid being under the control of a timer, to be described. Solenoid 116 has internal spring means, not shown, which tends to rotate shaft 117 of the solenoid clockwise. When the solenoid is energized, shaft 117 thereof is turned counterclockwise against the action of such spring. In the apparatus shown, the internal spring of the solenoid is supplemented by a coil tension spring 118 which extends between the rear end of a cross arm 119, which is secured to shaft 117, and the supporting plate 19. The other end of arm 119 is pivotally connected to a link 120, the upper end of link 120 being pivotally conencted to a bracket 121 secured to member 109 beneath shutter members 111, 112. The solenoid 116 is such that, when energized, it overcomes both the spring positioned internally of the solenoid and the spring 118 to open the shutter; when the solenoid is deenergized such springs quickly return the shutter to closed position.

To keep the temperature of the parts of the printing unit and those of the film sections within a safe range, there is provided a blower 122 which constantly draws a blast of cooling air through the lamp housing 105 while the printing unit is in operation. The inlet end of blower 122 is connected to the rear end of housing 105, as shown in FIGS. 4 and 5. The blower is driven by a motor 125 mounted coaxial therewith within housing 20. Louvres 126 at the front of housing 20 and 129 at the rear thereof provide for the inlet of cool air to the lamp housing. Louvres 127 at the side of the housing provide for the discharge of warm air from the blower.

The printing unit is provided with a setting lamp in the form of a source of subdued light which, in effect, becomes operative when the shutter 110 is in closed position, thereby to facilitate the selection and positioning of the section of the film strip to be printed. The setting lamp is made up of an elongated light bulb 130 of relatively low power positioned horizontally within a reflector housing 131 which directs the light from bulb 130 in a horizontal direction toward the longitudinal vertical plane containing the transverse center line of the opening 24 at printing station 22. The setting lamp 130, 131 is positioned somewhat above printing light bulb 104, and so that when shutter 110 is in its open position (FIG. 8a) substantially all the direct light from bulb 130 is intercepted by plate 111 of shutter 110. When the shutter 110 is in closed position, it lies at an angle of substantially 45° with respect to the vertical and reflects light from bulb 130 vertically upwardly through opening 24 at the printing station. To improve the light reflecting properties of the surface of plate 111 facing light bulb 130, such surface may be painted with white paint or enamel. During operation of the printing unit the setting light bulb 130 is allowed to burn continuously, since shutter 110, in effect, renders the setting lamp operative and inoperative at the required times in the cycle.

After a film section 11 in a duplicate card 10 has been printed as described, the duplicate card is removed from the printing station and the film section therein is developed. The photo-printing apparatus shown is adapted for printing and developing thermally developable film sections. It will be understood, however, that within the scope of the invention the apparatus may be modified to treat duplicate film sections of other types which are developed, for example, by being treated by vapor or liquid. With such other types of films the film-developing portion of the apparatus will, of course, change accordingly.

The developer 17 which is illustrated herein includes means for subjecting the portion of duplicate card 10 bearing film section 11 to a developing heat treatment as the card is being conveyed therethrough. The construction and function of developer 17 will be more readily understood upon consideration of FIGS. 1, 2b, 6 and 7. Positioned at the right of printing unit 15 (FIG. 1) and somewhat rearwardly of the main portion of the latter is a heating unit generally designated 132. Unit 132 is in the form of a chamber 134 having side walls 136, 136', end walls connecting the side walls, a bottom member 135, and a top member 137. The side and end walls, and the top and bottom of the heating chamber are preferably made of strong, heat-resisting material. Vertically adjustable within chamber 134 is a platform 139 carrying an electrical heating resistance unit 142. Platform 139 is carried by a large centrally located screw 140, the head of the screw being exposed to allow the turning of the screw and thus the vertical adjustment of platform 139 upon the removal of a protective cap 141 which overlies unit 132. It will be understood that with the subjection of heating element 132 to a constant voltage the temperature to which the lower wall 135 of unit 132 is heated may be varied within an appreciable range by the described adjustment of platform 139. To maintain the temperature of member 135 within close limits, there is provided an adjustable thermostat 144 which is exposed to the portion of chamber 134 immediately above member 135. Thermostat 144 is connected to control heating element 142 in the manner shown in FIG. 10, to be discussed.

Figure 7:
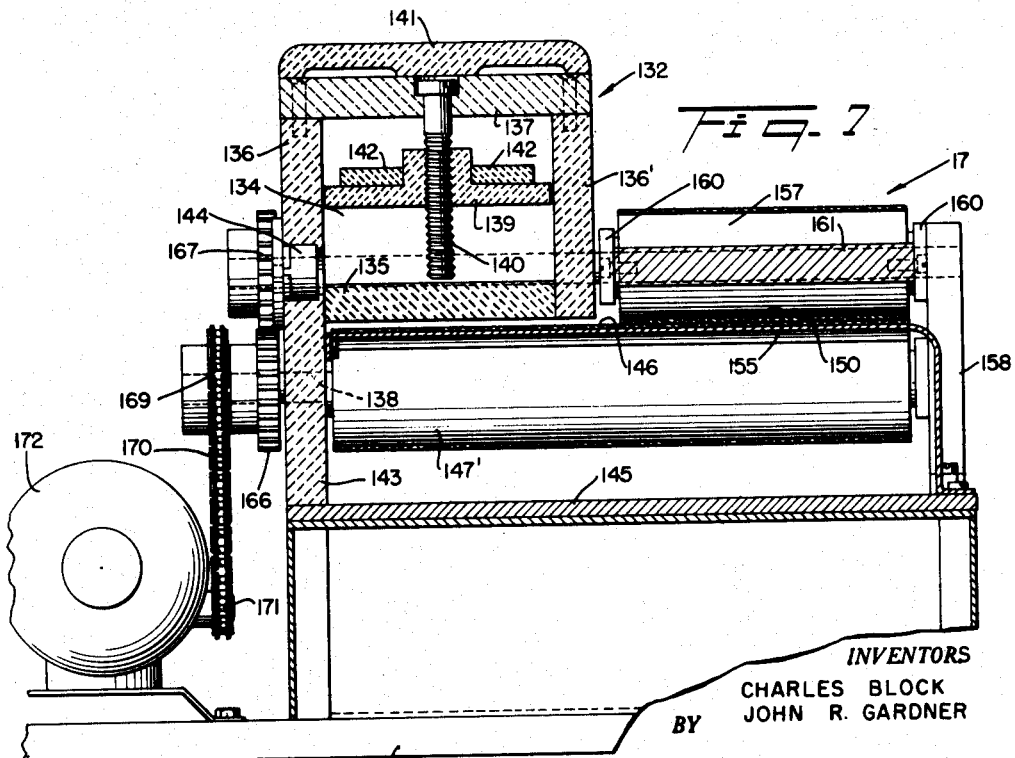
FIG. 7 is a vertical section through the film developing mechanism of the apparatus, the section being taken along the line 7—7 of FIG. 6.

Heating unit 132 is mounted on a transversely extending frame member 143 which is supported by a raised platform 145 attached to base plate 19 at the right of the photoprinting device. In the embodiment shown, frame member 143 and sidewall 136 of unit 132 are integral, the element 136, 143 being made of strong, rigid heat resisting material such as that known as Grade G.S.C. insulation, sold by Manne Knowlton Company, New York, N.Y. Spaced from frame member 143 are two upstanding bracket members 153 and 158, which with frame member 143 provide support for the upper and lower card-conveying belts 155 and 146, respectively. The lower feed belt 146 runs over an idle front roller 147 and a driven rear roller 147', which are so positioned that the upper run of the belt lies in the horizontal plane. Such upper run of the belt runs over and is supported by a broad supporting platen 150 affixed at one side to platform 145 and at the side to frame member 143. Belt 146 has a width somewhat exceeding the length of duplicate card 10, and, as shown in FIG. 7, the left hand portion of the belt runs beneath unit 132, the lower surface of the bottom member 135 of heating chamber 134 lying spaced somewhat above the upper run of belt 146.

Belt 146 is maintained under the requisite tension and in the proper alignment by means providing for the adjustment of roller 147 either forwardly or rearwardly as required, and by providing for a slight pivoting adjustment of roller 147 in a horizontal plane. As shown in FIG. 2b, the left hand end of shaft 148 which carries roller 147 is mounted in the bearing block 149. Bearing block 149 is square in external configuration and is slidably positioned in a horizontal slot 163 which extends inwardly from the forward edge of frame member 143. The inner end of the bearing block is provided with a pilot pin 173 which is slidable in a horizontally extending hole 178 at the bottom of slot 163. Centrally of its outer forward face bearing block 149 has a forwardly extending threaded stem or stud 151 connected thereto. Stud 151 extends through a plate 168 which overlies the forward end of slot 163. Bearing block 149 is pulled forward to the desired adjusted position by a nut 152 threadedly engaged with stud 151 and positioned outwardly of plate 168.

The other end of shaft 148 is journalled in a bearing in front bracket member 153. Roller 147 may be adjusted angularly through a small angle in a horizontal plane by shifting bracket 153 forwardly or rearwardly on supporting plate 145. To allow such adjustment of bracket 153, the base thereof is provided with a transversely extending slot through which studs 154 attaching the bracket 153 to plate 145 extend.

The upper conveyor belt 155 overlies the lower conveyor belt 146 at the rear of the latter, leaving the forward end of the lower conveyor belt exposed for the reception of printed duplicate cards to be developed. The upper belt 155 has its lower horizontal run of such length that it spans the heating unit 132. Belt 155 is positioned beside the lower end of unit 132, and with lower belt 146 grips the end of printed card 10 which lies remote of the end of the card carrying the film section 11.

The upper conveyor belt 155 is entrained over spaced parallel front and rear rollers 156, 157, respectively. The rear roll 157 is carried on a shaft 188 which at one end is mounted in a bearing carried by the upper end of bracket member 158, and adjacent its other end is mounted in a bearing supported in frame member 143. The forward roller 156 is rotatably mounted in bearings supported in the forward ends of two spaced link members the rear ends of which are pivoted about shaft 188. Such link members function to maintain belt 155 in taut condition, and allows the belt to maintain a yielding pressure upon cards 10 as the cards pass between the upper and lower conveyors. Each of the side links includes a rear portion 159 and a forward portion 160 aligned therewith, the two link portions being adjustably connected by an interposed plate-like member 161 which spans the confronting ends of parts 159 and 160. Longitudinal adjustment of part 160 relative to part 159 is readily effected by loosening screws 162 which attach member 161 to part 160, pulling part 160 forwardly to tension belt 155 in the desired amount, and then tightening screws 162.

To insure that cards 10 enter correctly beneath developing heater unit 132, there is provided a hold-down roller 164 immediately in front of the heater unit. Roller 164, which has its axis disposed parallel to the axis of roller 156, is loosely retained on the forward wall of unit 132 by a generally L-shaped member 165 which is attached to said forward wall and extends forwardly to overlie roller 164 generally centrally of the latter. Such roller is thus free to yield somewhat upwardly as a card passes thereunder. Frame member 143 and the inner link member 160 confronting the roller 164 prevent undue longitudinal shifting or escape of the roller from its retaining means 165.

Figure 6:
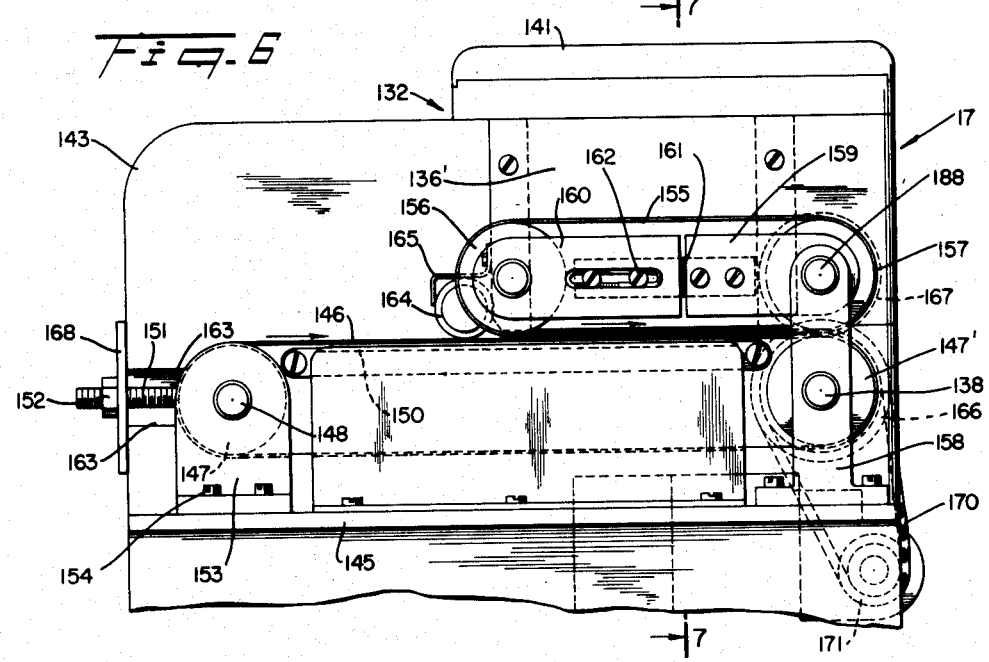
FIG. 6 is a fragmentary view in end elevation of the photoprinting apparatus showing the film developing mechanism thereof, the view being taken from the line of 6—6 of FIG. 2b.

The developing unit includes means whereby conveyor belts 146 and 155 are driven in synchronism in the direction shown by the arrows in FIG. 6. The driving means includes an electric motor 172 having a speed reducer unit integral therewith. A chain 170 drivingly connects a sprocket 169 keyed to shaft 138 with a sprocket 171 keyed to the output shaft of motor 172. Shaft 138 of the lower conveyor belt and shaft 188 of the upper conveyor belt are geared together by pinions 166 and 167 keyed to their respective shafts. By reason of the mounting of gear 167 coaxial of the pivotal axis of the upper converoy belt, the gears retain their meshing relationship at all times.

In FIG. 10 there is shown a somewhat schematic wiring diagram for the various elements and control mechanisms for the above described photoprinting apparatus. As there shown, the printing unit and the developing unit of the apparatus are fed with electrical current through a main switch 176, which conveniently is in the form of a toggle switch mounted on a control panel 182 at the front of the housing 20 of the printing unit. From the main switch there extend main feed wires 174, 175 for the apparatus. The exposure lamp 104 is energized by a circuit connected between wires 174 and 175, such circuit including a transformer 177 from which lamp 104 is fed. If desired, the transformer may be of the type permitting variation of the secondary voltage, thereby permitting the light output of lamp 104 to be varied. The visual setting lamp 130 is connected directly between wires 174 and 175, so that the lamp 130 is lighted at all times when main switch 176 is closed. The heating element 142 of the developing unit 17 is connected in series with thermostat switch 144, the circuit containing element 142 and switch 144 being connected between leads 174 and 175. Preferably a signal light 179 is connected in parallel with heating element 142 so as to indicate visually when the heater is energized. Conveniently, signal light 179 is mounted on control panel 182, as shown.

The motor 125 for the cooling fan 122 and the motor 172 which drives conveyor belts 146 and 155 are likewise connected between wires 174 and 175. Preferably motor 172 is under the control of an adjustable autotransformer or powerstat 180 which is connected in series with the motor, whereby the speed of motor 172 may be varied as desired. Powerstat 180 is conveniently mounted beneath control panel 182, and is provided with a control handle 199 on the panel, as shown in FIGS. 1 and 2a.

The latch solenoid 75 and the shutter solenoid 116 are under the joint control of microswitch 80 and a conventional electrically energized timer 181. The timer includes an electric motor 183 which is mechanically connected to the central movable contact member 186 of a timer switch 184 in a conventional manner (not shown) so that when the timer motor 183 is deenergized contactor 186 lies in its upper position to engage contact 187, and when timer motor 183 is energized contactor 186 lies in its lower position to engage contact 189. Microswitch 80 is connected in series with timer motor 183, the circuit including wire 201, microswitch 80, wire 202, wire 185, motor 183, and wire 204, being connected between lead wires 174 and 175. The fixed terminal of the central movable contactor 186 is connected to wire 202 of such circuit.

A wire 195 leads from upper fixed contact 187 of timer switch 184 to one side of latch solenoid 75. The other side of the latch solenoid is connected to lead wire 174 by a wire 191. The lower fixed contact 189 of timer switch 184 is connected to one corner of a four-sided rectifier bridge circuit 194 by a wire 190. The opposite corner of the rectifier bridge circuit is connected to wire 191 by a wire 192. It will thus be seen that the rectifier bridge is energized when movable contactor 186 is in its lower position, and that it is deenergized when contactor 186 is in its upper position. The remaining two opposite corners of the bridge circuit 194 are connected to the opposite sides of shutter solenoid 116 by wires 196 and 197, respectively, whereby solenoid 116 is energized when contactor 186 lies in its lower position. The timer is provided with a setting handle and indicator 200 on the control panel, cooperating with a timer scale 203 whereby the printing time may be preselected.

In using the apparatus, the operator first closes the main switch 176, whereby exposure lamp 104 and visual setting lamp 130 are lighted. Assuming that the temperature of chamber 134 is below that demanded by thermostat 144, heater 142 will be energized and heater indicator lamp 179 will be lighted. Motor 125, for the cooling blower 122, and motor 172, which drives the conveyor belts at the developing unit, start upon the closing of main switch 176. At this time platen 59 will be in fully open position, switch 80 is open, and contactor 186 of switch 184 lies in its upper position.

The operator then traverses the film strip 12 to bring the section thereof he wishes to reproduce over the opening 24 at printing station 22. At this time, also, solenoids 75 and 116 are in deenergized condition, and shutter 110 is closed. Setting lamp 130 is thus operative to facilitate the positioning of the film strip. A duplicate card 10 is then deposited in the card holder 56, 57 with the film section 11 thereof overlying opening 24. After a final positioning of a film strip, if necessary, by turning knobs 49, 50, 51, and 52 as required, the operator turns handle 200 of the timer 181 to the desired length of exposure time indicated on scale 203. He then closes platen 59, whereby to press the portion of card 10 bearing film section 11 firmly into engagement with the selected section of film 12 at the printing station. Until the platen has reached its fully closed position, microswitch 80 remains open, timer motor 183 remains deenergized, and contactor 186 remains in its upper position. When the platen 59 reaches substantially its fully closed position, the latch member 67 thereon closes microswitch 80, thereby starting timing motor 183 and thus shifting contactor 186 into its lower position. When the platen 59 is fully closed, spring 77 thrusts latching dog 70 into slot 69 on the latching member of the platen to hold the platen in closed position. Simultaneously therewith, the closing of contacts 186, 189 energizes the shutter solenoid 116 to open the shutter and start the printing cycle.

At the end of the preselected printing time, timer motor 183 stops, and contactor 186 is moved thereby into its upper position so that the shutter solenoid 116 is deenergized and the latch solenoid 75 is energized so long as microswitch 80 is closed. As a result, the exposure shutter 110 moves to its closed position, terminating the printing cycle, and latching dog 70 is retracted allowing the platen 59 to be opened by springs 64. Latch operating solenoid 75 is deenergized as soon as platen 59 begins to open, since the microswitch 80 then opens, but the inertia of the solenoid plunger and of parts 71, 76, etc. is such that latch member 67 will have cleared latching dog 70 before spring 77 returns such parts, including dog 70, to operative latching position.

The operator now removes the thus printed card 10 from the printing station 22 and deposits it on the forward end of the lower conveyor belt 146 of developing unit 17. The disposition of the printing unit relative to the developing unit is such that the operator need not turn the card in transferring from the printing to the developing unit. Thus, the possibility of the faulty orientation of the card at the developer is minimized. The card 10 travels with the lower conveyor belt 146, the end of the card bearing film section 11 then travelling beneath hold-down roller 164 and thence under the heating unit 132. The card is impelled rearwardly by the gripping of the main portion thereof between the upper and lower conveyor belts. One passage of the card through the unit 17 suffices to develop film section 11. The thus developed card is discharged from between the rear ends of belts 146 and 155. Preferably, means such as a card stacker or a further conveying means is provided for receiving the printed and developed cards.

Although only one embodiment of the invention has been illustrated in the accompanying drawings and described in the foregoing specification, it is to be expressly understood that various changes, such as in the relative dimensions in the parts, materials used, and the like as well as the suggested manner of use of the apparatus of the invention, may be made therein without departing from the spirit and scope of the invention as will now be apparent to those skilled in the art.

What is claimed is:

1. A photoprinting apparatus comprising means for holding an original and a duplicate member in reproducing relationship, said means including a selectively movable pressure platen for engaging the duplicate member, a source of printing light, a shutter selectively movable into shutter-closed position between the source of printing light and the original and duplicate members, a timer, means responsive to the placing of the platen in closed, duplicate-engaging position to start the timer, and means operated by and responsive to the timer to move the shutter to open position when the timer is running and to move the shutter to closed position when the timer is stopped.

2. A photoprinting apparatus as claimed in claim 1 comprising a solenoid for moving the shutter, an energizing circuit for the solenoid, and contacts operated by the timer and in the energizing circuit for the solenoid.

3. A photoprinting apparatus as claimed in claim 2 wherein the timer has an electric motor, and comprising an energizing circuit for the timer motor, and a switch which is interposed in the motor circuit and which is operated upon the closing of the platen to start the timer motor.

4. A photoprinting apparatus comprising means for holding an original and a duplicate member in reproducing relationship, said means including a selectively movable pressure platen for engaging the duplicate member, a source of printing light, a shutter selectively movable into shutter-closed position between the source of printing light and the original and duplicate members, a solenoid for moving the shutter, a first, energizing circuit for the solenoid, a timer having an electric motor, a second, energizing circuit for the motor, a source of electric current, the first and second energizing circuits being connected in parallel and to said source, a first switch responsive to the placing of the platen in closed, duplicate-engaging position to start the timer, said first switch being interposed between the current source and the first and second energizing circuits, and a second switch having contacts interposed in the second energizing circuit, said second switch being responsive to the timer so as to open the shutter when the timer motor is energized and to close the shutter when the timer motor is de-energized.

5. A photoprinting apparatus comprising means for holding an original and a duplicate member in reproducing relationship, said means including a selectively movable pressure platen for engaging the duplicate member, the platen being movable from closed, member-engaging position to open position free of the duplicate member, means to hold the platen in closed position, means including a solenoid to release the means holding the platen in closed position, a first, energizing circuit for the solenoid, a source of printing light, a timer to control the length of time that the duplicate member is subjected to printing light, said timer having an electric motor, a second, energizing circuit for the motor, a source of electric current, the first and second energizing circuits being connected in parallel and to said source, a first switch responsive to the placing of the platen in closed, duplicate-engaging position to start the timer, said first switch being interposed between the current source and the first and second energizing circuits, and a second switch having contacts interposed in the second energizing circuit, said second switch being responsive to the timer so as to release the platen-holding means when the timer motor is de-energized at the completion of a printing cycle.

6. A photoprinting apparatus as claimed in claim 5, comprising electrically operated means for selectively rendering the source of printing light effective and ineffective, a third, energizing circuit for the last named means, and wherein the second switch has contacts interposed in the third energizing circuit, and the second switch is so constructed and arranged that the first and third energizing circuits are alternately energized.

7. A photoprinting apparatus comprising means for holding an original and a duplicate member in reproducing relationship at a printing station, a light source spaced from the printing station, a shutter comprising a first hollow stationary member which houses said light source and having an aperture therein, a second rotatable hollow member having an aperture therein and being concentrically mounted in respect to said first hollow member, means to selectively rotate said second hollow member to an open shutter position wherein said apertures are in alignment with each other and to a closed shutter position wherein said apertures are out of alignment with each other, a plate attached generally tangentially of said second hollow member and rotatable therewith, two parallel members attached to the ends of said plate and lying beyond the respective ends of the apertures in the hollow members, said plate being disposed parallel to and along one side of the path of the light beam between the light bulb and the printing station when the shutter is open, lying across such path and, with the unapertured portion of the housing, intercepting such light beam when the shutter is in closed position, and stop means comprising a plate disposed along one side of and parallel to the path of light from the light source to the printing station, the free edges of the plate and the end members contacting said stop plate when the shutter is closed.

8. A photoprinting apparatus comprising means for holding an original and a duplicate member in reproducing relationship, said means including a selectively movable pressure platen for engaging the duplicate member, a source of printing light, an adjustable mask interposed between the duplicate member and the source of printing light, said mask comprising a plurality of mask members movable toward and away from the center of the duplicate member, and means connecting the mask members for equal movement in opposite directions with respect to the center of the duplicate member, a shutter selectively movable into shutter-closed position between the source of printing light and the original and duplicate members, means for moving the shutter, and means responsive to the positioning of the platen for controlling the means for moving the shutter.

References Cited in the file of this patent

UNITED STATES PATENTS

| | | |
|---|---|---|
| 1,542,923 | Urquhart | June 23, 1925 |
| 1,754,204 | Green | Apr. 8, 1930 |
| 1,763,208 | Altman | June 10, 1930 |
| 1,783,953 | Briggs | Dec. 9, 1930 |
| 1,987,036 | Tuttle | Jan. 8, 1935 |
| 2,100,087 | Priou | Nov. 23, 1937 |
| 2,158,903 | Knobel | May 16, 1939 |
| 2,273,385 | Steiner | Feb. 17, 1942 |
| 2,395,970 | Kershaw | Mar. 5, 1946 |